(12) United States Patent
Tüllmann

(10) Patent No.: US 8,181,321 B2
(45) Date of Patent: May 22, 2012

(54) CARRIER DEVICE FOR MACHINE TOOLS

(75) Inventor: Udo Tüllmann, Eisenach (DE)

(73) Assignee: Deckel Maho Seebach GmbH, Seebach (DE)

( * ) Notice: Subject to any disclaimer, the term of this patent is extended or adjusted under 35 U.S.C. 154(b) by 0 days.

(21) Appl. No.: 13/006,357

(22) Filed: Jan. 13, 2011

(65) Prior Publication Data

US 2011/0233879 A1    Sep. 29, 2011

Related U.S. Application Data

(63) Continuation of application No. PCT/EP2009/004988, filed on Jul. 9, 2009.

(30) Foreign Application Priority Data

Jul. 25, 2008    (DE) .................. 10 2008 034 728

(51) Int. Cl.
B23P 23/02    (2006.01)
B23C 1/14    (2006.01)
(52) U.S. Cl. ........ 29/27 C; 409/168; 409/212; 409/235; 409/201; 74/490.08; 269/58; 269/71
(58) Field of Classification Search .................. 29/27 C, 29/27 R; 409/168, 224, 202, 212, 235, 201, 409/211, 216, 219, 225, 165, 167, 166; 74/490.07, 74/490.08, 490.1; 269/57, 58, 62, 71; 408/236–237, 408/71
See application file for complete search history.

(56) References Cited

U.S. PATENT DOCUMENTS

| | | | | |
|---|---|---|---|---|
| 2,651,975 | A * | 9/1953 | Soloff ........................... | 409/184 |
| 5,678,291 | A | 10/1997 | Braun | |
| 6,557,235 | B1 * | 5/2003 | Katz et al. ....................... | 29/563 |
| 6,575,676 | B2 * | 6/2003 | Wang et al. .................... | 409/201 |
| 6,682,276 | B2 * | 1/2004 | Harami et al. ................. | 409/134 |
| 7,591,620 | B2 * | 9/2009 | Schmidt et al. ............... | 409/235 |
| 7,645,103 | B2 * | 1/2010 | Schmidt et al. ............... | 409/168 |
| 2003/0182782 | A1 * | 10/2003 | Hessbruggen et al. ....... | 29/27 C |
| 2008/0175684 | A1 | 7/2008 | Schmidt et al. | |
| 2009/0238655 | A1 | 9/2009 | Schmidt et al. | |

FOREIGN PATENT DOCUMENTS

| | | |
|---|---|---|
| DE | 4236295 A1 | 4/1993 |
| FR | 2816230 A1 | 5/2002 |
| WO | 2006072356 A | 7/2006 |
| WO | WO-2010/009816 A1 * | 1/2010 |

OTHER PUBLICATIONS

Getriebetechnik Analyse, Synthese, Optimierung 2. Auflage Springer Verlag Berlin Heidelberg NewYork/K. Luck, K.-H. Modler, 1995 Seite 37, 38, 39—ISBN 3-540-57001-2.

* cited by examiner

*Primary Examiner* — Erica E Cadugan
(74) *Attorney, Agent, or Firm* — The Maxham Firm

(57) ABSTRACT

A machine tool having a carrier device for workpieces or tools or tool spindles. A console supports the carrier and can be pivoted about a first axis (X) from the horizontal into the vertical position and beyond. The console is pivotably housed on carriages guided in the machine body. The carrier for a workpiece, a tool, or a tool spindle is arranged on the console, and a drive device is provided for the synchronous displacement of the carriages on guide rails fixed on the machine tool. The console is hinged via two crank-like arms to the stationary machine body in addition to being supported on both carriages to form a kniematic coupling.

16 Claims, 7 Drawing Sheets

CARRIER DEVICE FOR MACHINE TOOLS

FIELD OF THE INVENTION

The invention relates generally to a machine tool carrier device for workpieces, tools, or tool spindles, and includes a console that can be pivoted about an axis as a result of linear carriage movements.

BACKGROUND

For the universal multiaxial machining of complex workpieces in a chucking device, carrier devices and workpiece table arrangements have been known for a long time in various embodiments with which the workpiece clamped on a workpiece table may be pivoted by 90° from a horizontal to a vertical position and vice versa. If the workpiece table arrangements contain rotationally driven rotary tables, it is possible to perform five-axes machining operations by these motor-driven pivoting movements, that is, the top surface and all sides of the workpiece can be approached and machined one by one by the machining tool in continuous succession.

European patent publication, EP 1 882 544 A, discloses a drilling and milling machine configured for five-axis machining of workpieces that comprises a generic carrier device including a workpiece table arrangement. The workpiece table may be pivoted by a motor from a horizontal into a vertical position, with inclined positions also being possible. In this carrier device, guide rails on pedestals are provided inside next to the two side walls of the machine frame, on which two carriages are arranged so as to be synchronously displaceable by means of electric linear motors. In both carriages a bridge-like console is pivotably supported whose middle part offset with respect to the pivoting axis forms the support for a rotary workpiece table. Direct drive electric motors, which are installed in both carriages, are used to pivot the bridge-like console. The drilling and milling machine has a vertical milling head as the machining unit which is displaceably guided in the horizontal X coordinate axis and in the vertical Z coordinate axis on the machine frame. The travel movements in the horizontal Y coordinate axis are performed by the workpiece carrier device. Due to the support of the bridge-like pivoting console on both sides in the two dimensionally stable carriages, it is possible to achieve sufficiently high rigidity even in case of relatively large diameters of the workpiece table. However, the relatively high space requirement of the table arrangement and the considerable technical efforts can be a disadvantage, for example, because of the two electric direct drives in the carriages which need to have considerable dimensions for pivoting the bridge-like console together with the workpiece table and the chucked tool that may have a heavy weight.

In addition to that, European patent publication EP 0 712 682 A discloses a drilling and milling machine in a gantry constructional style configured for machining workpieces in five-axes, whose machine stand has two spaced-apart parallel side walls. A pivotable workpiece carrier device is provided between these side walls, whose bridge-like pivoting console carries a rotationally driven workpiece rotary table and is directly supported in the side walls of the machine stand via two lateral horizontal bushes. Electric drives that are installed on the outside of the lateral walls are used to pivot the console about the common support axis. The bridge-like console has a middle part offset with respect to the common rotational and supporting axis on which the workpiece rotary table is supported. Both sides of this middle part are firmly connected to the inner ends of the bearing bushes provided in the side walls. Instead of the pivotable workpiece carrier device a stationary workpiece table may also be used in this known milling and drilling machine which is laterally attached to pedestals formed on the inner sides of the lower regions of both side walls.

Another machine tool for the five-axis milling machining of workpieces is described in PCT publication WO 2006/072356 A. The workpiece table used in this machine tool has a rotating/pivoting unit whose rotating unit is disposed in a pocket-like recess provided in the center area. The rotating unit is firmly connected to the pivoting unit at a front face thereof via a lateral inclined support. The placement of the rotating unit in the pocket-like recess is to lower the overall structural height of the workpiece table arrangement.

SUMMARY OF EMBODIMENTS OF THE INVENTION

It is a purpose of embodiments of the invention to provide a carrier device for workpieces and tools or tool spindles which requires little space, has a simple structure as to the drive technology, increased rigidity, and permits high adjustment speeds. This purpose is achieved by the fact that the console, in addition to being supported on the carriage structure, is coupled in an articulated manner to a stationary component of the machine body via crank-like arms or a hinge support.

Technically speaking, the carrier device according to embodiments of the invention is simply structured because it needs no rotating drives for adjusting the workpiece table from the horizontal position thereof into an inclined or vertical position or vice versa. The adjusting/pivoting movements of the console with the workpiece table from the horizontal position thereof into an inclined, vertical, or tipped-over position, and vice versa, are effected by a linear movement of the carriage structure on lateral guide rails mounted to the machine body, preferably on pedestals on the inner sides of the side walls of the machine stand. The rotational support of both sides of the console on the carriage structure and the linkage of the bridge-like console, which is spaced apart from the rotational support, via the crank-like acting arms to the stationary components of the machine body, for example, to the side walls of the machine stand, result in a kinematic coupling in the course of which the console, together with the workpiece table supported thereon, assumes an inclined position gradually increasing from the horizontal initial position until the vertical orientation, or possibly also a tipped-over position, has been reached. Because merely linear drives and no other rotational drives are required for the pivoting movement of the console, the result is a considerable simplification of the construction with respect to drive technology, lowered manufacture costs, and also less required space due to the omission of the voluminous rotational drives, as compared with the known prior art.

According to a suitable embodiment of the invention, two crank-like arms are provided whose free arms are supported in rotational bearings in the side walls of the machine stand that form the stationary component of the machine body. This support makes it possible to use structurally simple components and leads to high rigidity of the support. Suitably, these bearings of the free end parts of the crank-like arms are disposed in the side walls of the machine stand above the workpiece carrier device so that they are largely protected from chip depositions.

In order to increase their rigidity and to bridge free spaces the crank-like arms have a curved shape and at the one end thereof carry an inner, that is, an inward facing bearing bush which is part of the bearing arrangement in the console, and an outer, that is, an outward facing bearing bush at the other end thereof, which is part of the bearing arrangement in the respective side wall of the stand.

In order to achieve the desired adjustment movements of the table arrangement into the horizontal position and the inclined or vertical positions, the bearings of the crank-like arms in the console are at a predetermined distance to the bearing arrangements of the console on the carriages. The length of the crank-like arms are arranged to match this distance between the bearings in the console. Suitably, the bearings of the crank-like arms in the console and the bearing arrangements of the console on the carriages in the console are in a common plane, enabling a low height of the console and thus correspondingly little required space.

According to a further advantageous embodiment of the invention, electric linear motors are used as drive devices for the linear travel movements of the carriage structure. It should be understood that conventional linear drives such as pressure fluid cylinders, spindle drives (ball screw spindles), among others, can be used as well. If electric linear motors are used, the plate-shaped primary and secondary parts thereof are disposed on the machine body, preferably in an oppositely inclined manner, thus forming a solid and possibly even self-centering rest for the console.

A technical aspect of embodiments of the invention is the fact that the console is pivotably supported on a linearly displaceable carriage structure and additionally is coupled to a stationary component of the machine body, for example, via a crank-like hinge support. This makes it possible that by a linear movement of the carriage structure the rotational bearings of the console are also linearly moved. At the same time the kinematic coupling of the console to the machine body makes the console pivot together with the reception table mounted on the top surface thereof, which table is thus adjusted to respective desired operational positions; in a horizontal, inclined, or vertical manner.

Two separate lateral carriages may be provided in which the console is pivotably supported via lateral bearing pins, each carriage running on its own guide rail and means for synchronous movement being provided. Apart from that, the two lateral carriages may also be firmly connected to each other, for example, by transverse supports, bars or the like, so that a fixedly assembled carriage structure results. In this case it is possible to use only one single drive assembly at the center part of the carriage structure, for example, in the shape of a single electric linear motor or a conventional linear drive.

The guide rails for the carriage structure may extend horizontally in the direction of the Y coordinate axis in parallel to the side walls of the machine stand. In this case the carriage structure carries out a translational movement in the horizontal plane when the drive is activated, for example, the synchronous electric linear motors. In a suitable variant, however, the guide rails are disposed in an inclined manner at an acute angle in the machine stand, namely, rising from the front face to the rear. Thus, the carriage structure is automatically also lifted with the console and the workpiece table when they are moved, which means that a faster change of position of the workpiece table from the horizontal into the vertical position thereof, and vice versa, can be achieved.

In another embodiment of the invention, the carrier device contains a holder for clamping a relatively short workpiece or a lathe chisel or a milling spindle instead of a rotatable or non-rotating workpiece table. Thus, it is possible to perform vertical and horizontal rotational and milling operations. The holding device mounted to the console may be a so-called clamping chuck in which, for example, turning tools are clamped at their tool shaft. In such a case the machining unit, that is, the milling head of the machine tool, is used to hold a short workpiece on which turning operations are performed.

BRIEF DESCRIPTION OF THE DRAWING

Further purposes, advantages, and particulars of the invention can be taken from the following detailed description with reference to the accompanying drawing, wherein.

DETAILED DESCRIPTION OF EMBODIMENTS OF THE INVENTION

Figure 1:
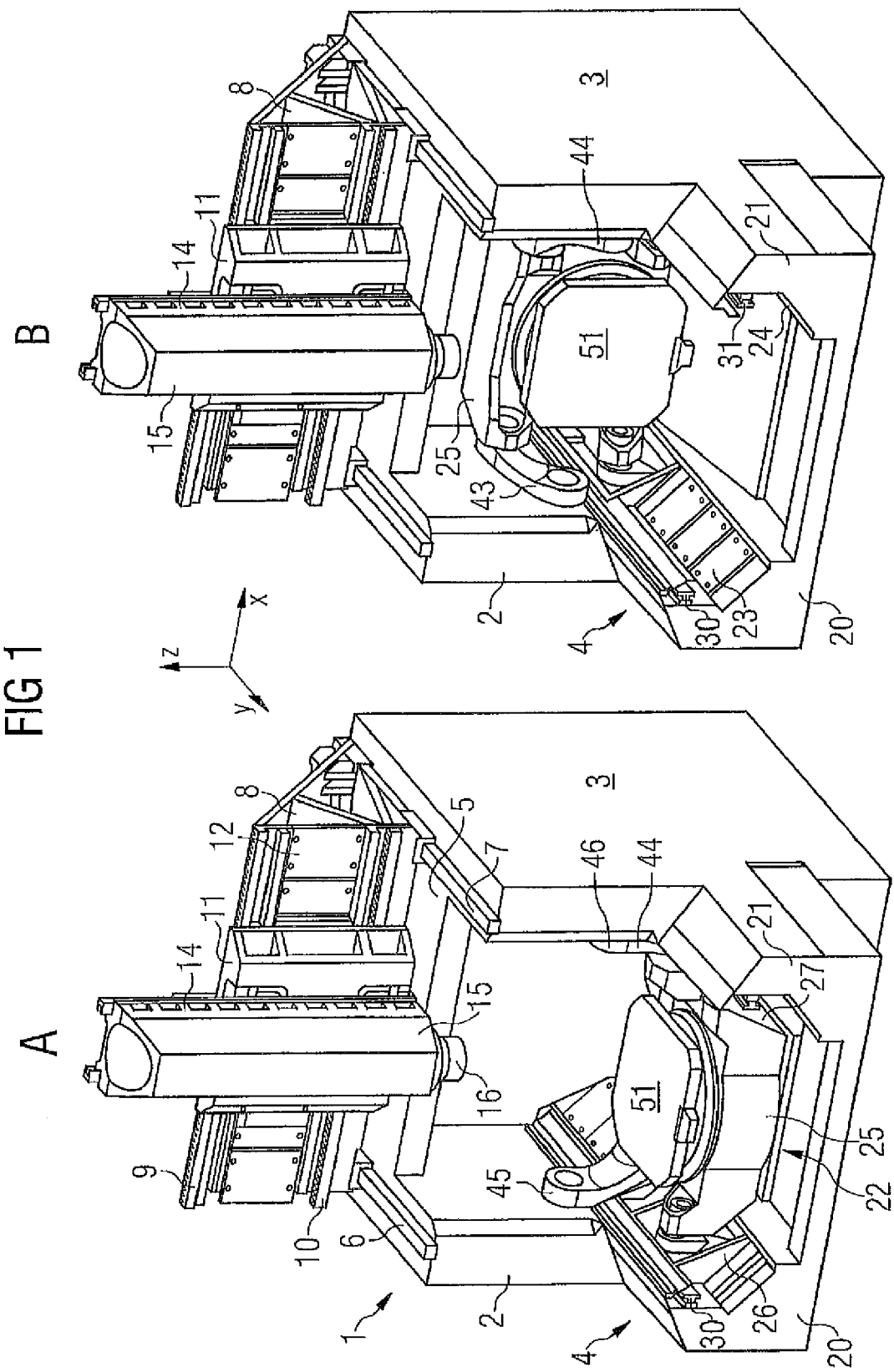
FIGS. 1A, B show a schematic perspective view of a machine tool comprising an embodiment of a carrier device according to an embodiment of the invention, and showing X, Y, and Z coordinate axes, in a horizontal position (A), and in a vertical position (B)

The milling machine perspectively illustrated in FIG. 1 is executed in a gantry constructional style and contains highly rigid machine body or stand 1 formed by two side walls 2, 3 parallel to each other, front section 4 extending in a forward direction from the side walls, and upper cover plate 5. On the top surface of side walls 2, 3, guide rails 6, 7 are mounted in an orientation parallel to each other on which transverse carriage 8 is guided so as to be displaceable by a motor (not shown) in the direction of the Y coordinate axis. On the vertical front side of the transverse carriage, two parallel guide rails 9, 10 are mounted at a vertical distance in which to horizontal carriage 11 is guided so as to be displaceable in the direction of the X coordinate axis. Electric linear motor 12 is disposed between guide rails 9, 10 and is used as a drive for the horizontal carriage. On the front side of the horizontal carriage, vertical carriage 14 is mounted so as to be displaceable in the Z coordinate axis, wherein an electric linear motor (not shown) is suitably used as a drive assembly. Vertical carriage 14 carries machining unit 15 in the shape of an installed milling head comprising work spindle 16.

Front section 4, extending along the front side of side walls 2, 3, contains two side walls 20, 21 of a lesser height in comparison to machine side walls 2, 3. Side walls 20, 21 are connected to or extend from side walls 2, 3 of the machine stand to form an overall highly rigid constructional unit. In the space between side walls 20, 21 of front section 4, carrier device 22 is provided that will be described in detail below.

Figure 2:
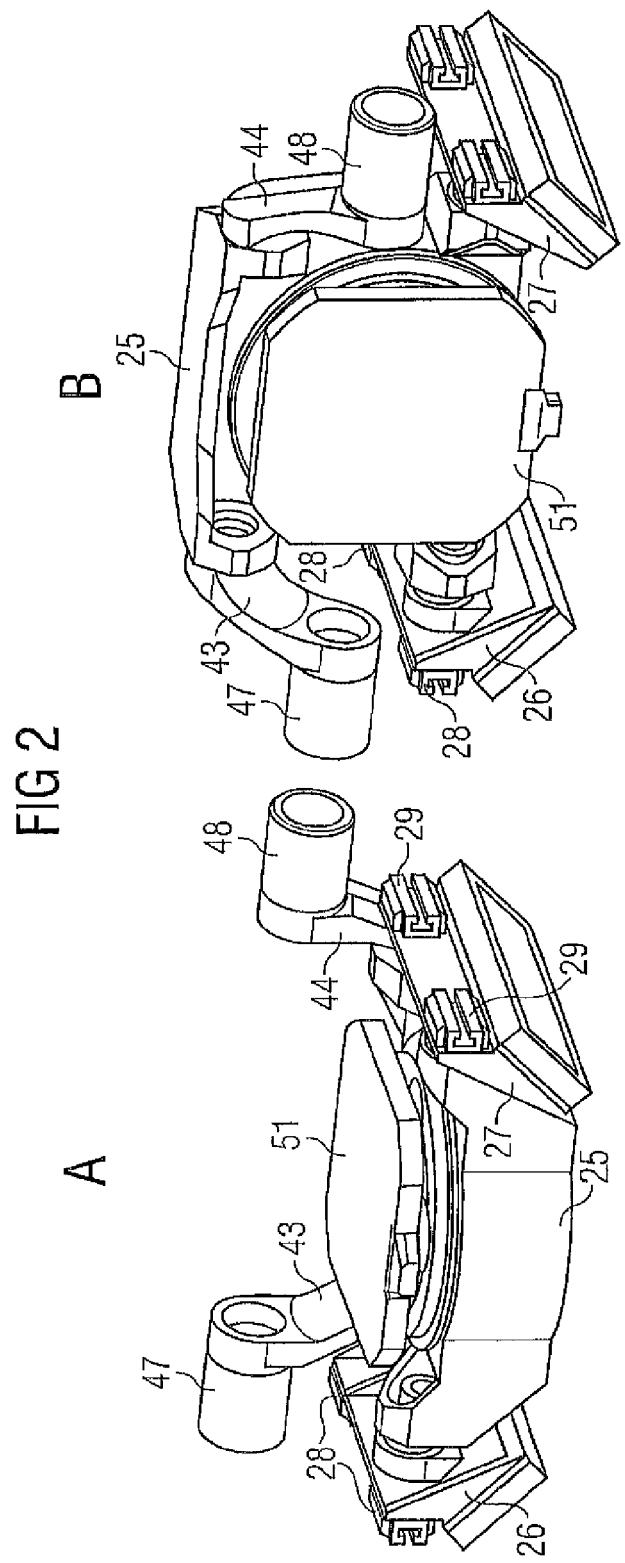
FIGS. 2A, B are perspective views of the carrier device according to FIG. 1 in a horizontal position (A) and a vertical position (B)
Figure 3:
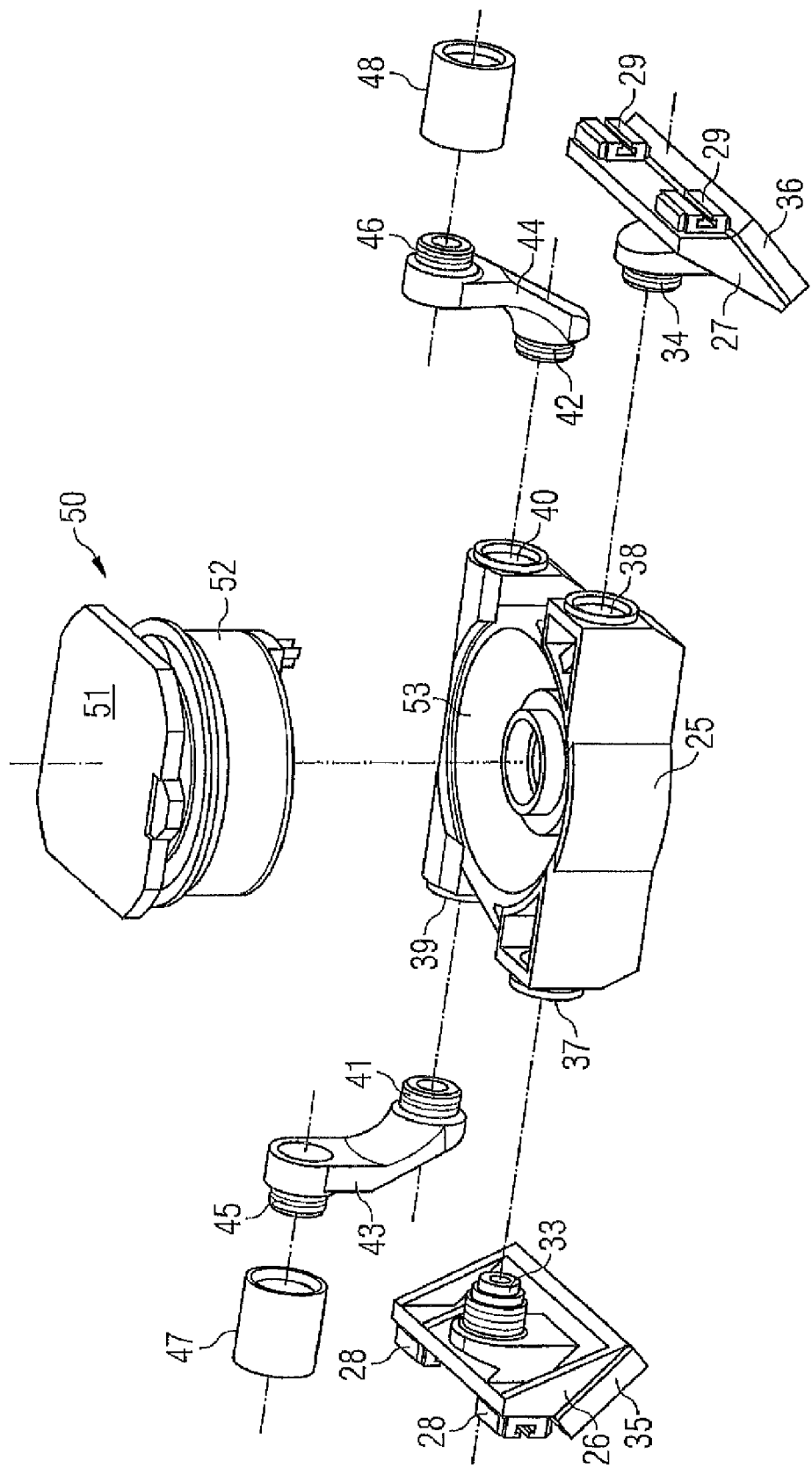
FIG. 3 is an exploded perspective illustration of the carrier device of FIG. 1.

With reference to FIGS. 2 and 3, carrier device 22 has a bridge-like console 25 pivotably supported in two lateral carriages 26, 27 via bearing arrangements. Guide shoes 28, 29 are fixed to the outer surfaces of carriages 26, 27. These guide shoes cooperate with a respective guide rail 30, 31 mounted to the inner surfaces of side walls 20, 21 of front section 4 and side walls 2, 3 of the machine body. In this manner both carriages 26, 27 a are guided in an approximately horizontal plane. In each carriage 26, 27 a respective bearing 33, 34 (see FIG. 3) is provided on the inner surface, in which the front or forward end of console 25 is rotatably supported. Secondary members 35, 36 of corresponding electric linear motors are attached to outer inclined surfaces of carriages 26, 27, which secondary members cooperate with stationary primary motor members 23, 24 (FIG. 1B) that are disposed in an inclined manner on side walls 20, 21 of front section 4. Bearings 33, 34 each include the usual bushes and engage with lateral bearing openings 37, 38 formed in alignment in console 25. Carriages 26, 27 may optionally be firmly connected to each other by transverse supports, bars, floor plates, or other suitable components so as to form a dimensionally stable carriage structure. The use of a single drive assembly, for example, an electric linear motor to be disposed in the center, is sufficient to translationally displace the carriage structure assembled to form a solid device, which lowers technical efforts and costs.

As can be taken from FIG. 3, two further bearing openings 39, 40 are provided at the rear end part of console 25, in which inward facing bearing bushes 41, 42 are received that are provided at the lower ends of arcuate crank-like arms 43, 44. The upper ends of these two crank-like arms carry further outward facing bearing members 45, 46 that cooperate with a respective bearing bush 47, 48 located in side walls 2, 3 of machine stand 1. As an alternative, instead of the two illustrated crank-like arms 43, 44, it is possible to use only one hinge or pivotable support that is arranged between the rear of the console and a transverse stiffener of the machine stand.

In the embodiments according to FIGS. 1-6, console 25 forms the support for a workpiece rotary table 50 that has a rotationally driven table plate 51 for clamping workpieces. The table also has an inner electric direct drive motor (not shown) which advantageously may be a torque motor. This drive motor as well as corresponding guiding and locking members are installed in the usual manner in a ring body 52 of the workpiece table and are housed in a corresponding recess 53 of console 25.

Figure 4:
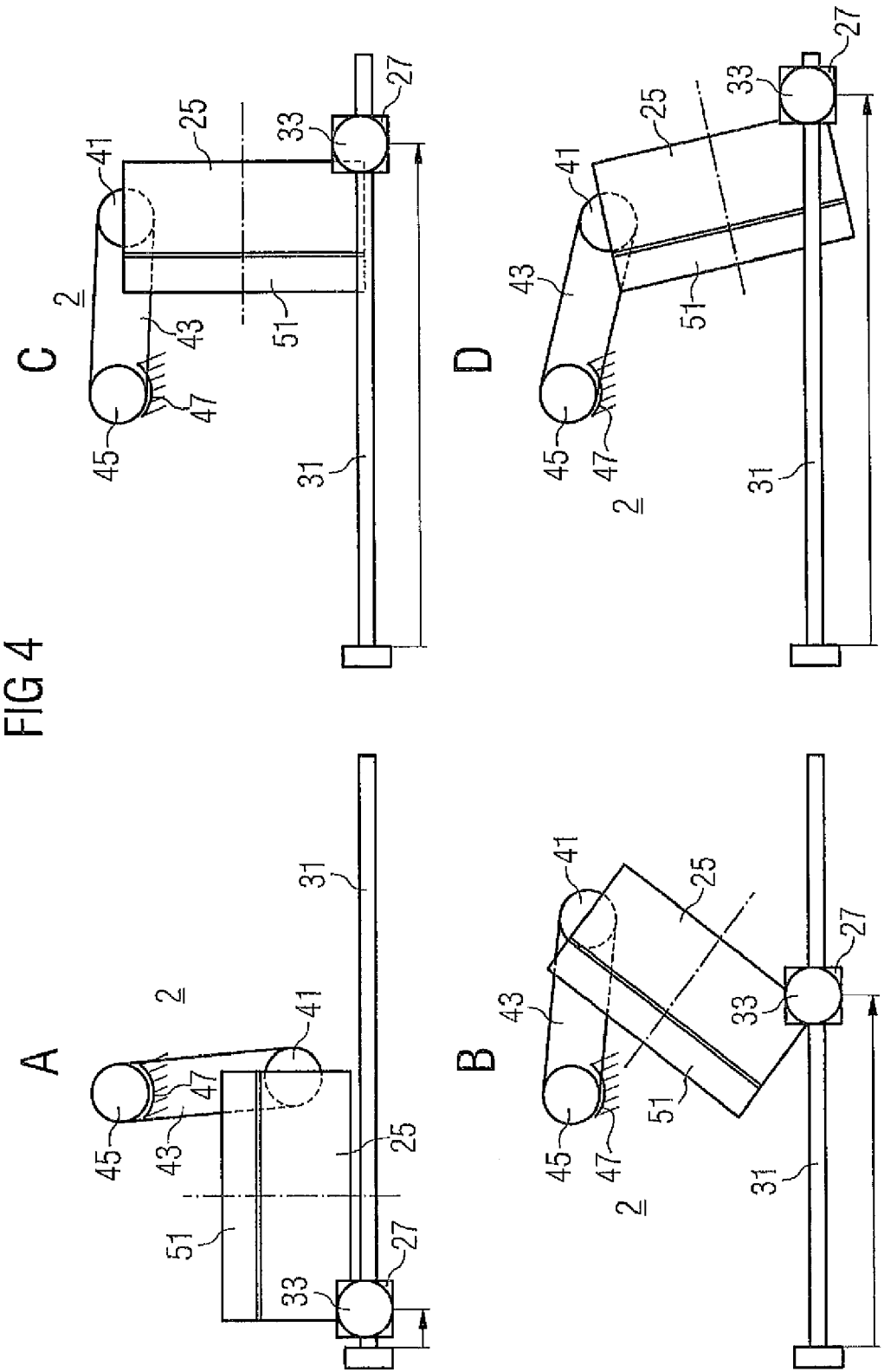
FIGS. 4A-D schematically show the functional principle of the embodiment of FIG. 1 in several stages, FIGS. 5A, B show the machine tool of FIG. 1 in another embodiment of the carrier device according to an embodiment of the invention.

The functional principle and the operating mode of the above-described embodiment of a carrier device in a machine tool according to FIG. 1 will be described below with reference to FIGS. 1 and 2 and the motion diagrams of FIG. 4.

If carrier or workpiece table 51 is to be moved from the horizontal position shown in FIG. 1A and FIG. 2A into the vertical position according to FIG. 1B and FIG. 2B, respectively, linear motors 23, 35; 24, 36 are activated which synchronously displace carriages 26, 27 from the front position shown in FIGS. 1A and 2A, into the rear position according to FIGS. 1B and 2B. As carriages 26, 27 are connected in an articulated manner to console 25 via bearings 33, 37 and 34, 38, the console is also moved along by the two carriages. The rotational axis of these bearings is offset in the same plane due to carriages 26, 27 being guided in lateral guide rails 30, 31 via their guide shoes 28, 29. Because console 25 is kinematically coupled to both side walls 2, 3 of machine body 1 via crank-like arms 43, 44, the displacing movement of the console in the region of front bearings 37, 38 leads to the console being positioned in a progressively inclined manner while at the same time crank-like arms 43, 44 are pivoted in both their end-side supports. This process is performed continuously until a desired end position of carrier or workpiece table 51, preferably the vertical position thereof according to FIG. 1B and FIG. 2B, has been achieved.

In FIGS. 4A-4D the functional principle of the carrier device according to an embodiment of the invention is schematically shown. The components that have the same functions as the individual parts of the machine tool according to FIGS. 1 and 2 are designated by the same reference numerals.

FIG. 4A shows an operational state of the carrier device in which console 25 and workpiece table, table plate, or carrier 51 are horizontally aligned, as also illustrated in FIGS. 1A and 2A. By activating electric linear motors 23, 35; 24, 36, shown in FIGS. 1A and 3, carriages 26, 27 are displaced to the intermediate position shown in FIG. 4B on stationary guide rails 30, 31. Since arms 43, 44, which are hinged to the rear end part of console 25 via the bearings or bearing bushes 41, 42 are rotatably supported with their free ends on stationary bearings 45, 47; 46, 48 on side walls 2, 3 of the machine body, lateral arms 43, 44 kinematically perform a pivoting motion as a consequence of the movement of the carriages 26, 27 which causes console 25 to pivot as shown. The linear movement of the console in connection with the pivoting motion of arms 43, 44 leads to an inclined position of console 25 and thus also of the workpiece table 51 mounted thereon. The angle of inclination of the console solely depends on the magnitude of the displacement and the movement of carriages 26, 27, so that any desired angle of inclination of console 25 between the horizontal position according to FIG. 4A and a "tipped-over" position shown in FIG. 4D may be selected. It is possible to lock console 25 or the carriages, or both, in any desired intermediate position by appropriate fixations (not shown). The console and the workpiece table reach the vertical position shown in FIG. 4C due to continuing smaller displacement of carriages 26, 27 by the electric linear motors and, if this horizontal movement of the carriages on rails 31 continues, they reach the "tipped-over" position shown in FIG. 4D in which particular cavities and indentations can be worked out in the workpiece by using simple machining tools. Basically the same functional processes result from variants in which the two carriages are assembled to form a common table structure and only one linear drive is used.

Figure 5:
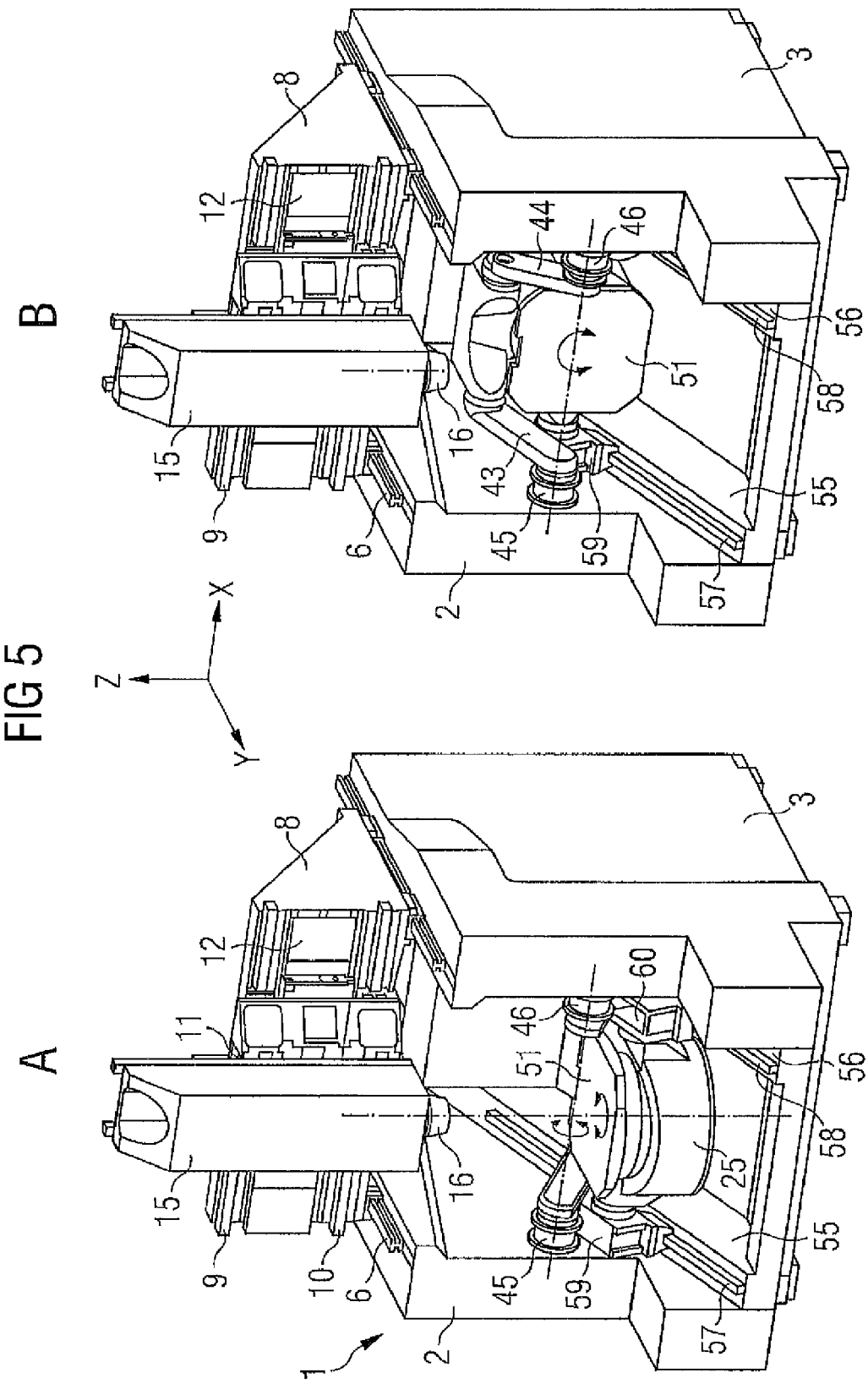
Figure 6:
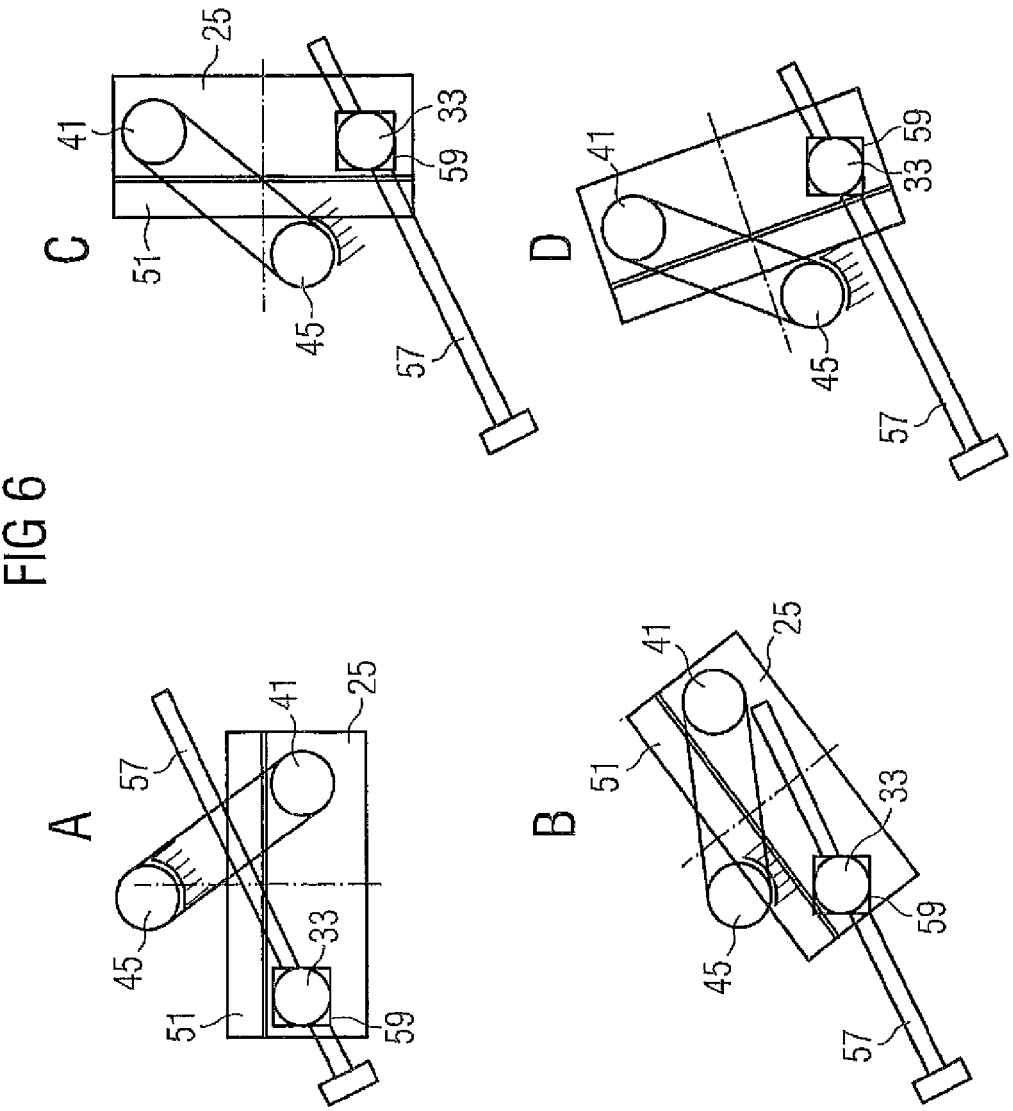
FIGS. 6A-D schematically show the functional principle of the embodiment of FIG. 5 in several stages.

The machine tool shown in FIGS. 5 and 6 corresponds to the milling machine according to FIG. 1 as concerns the technical concepts and construction thereof. Accordingly, the same components are designated by the same reference numerals and the milling machine according to FIGS. 5 and 6 will not be described again here in order to avoid repetition. Corresponding conditions apply for the carrier device, the functional parts of which essentially correspond to the components shown in FIG. 3.

A difference between the respective embodiments according to FIG. 1 and FIG. 5 consists in the fact that in the embodiment according to FIG. 1 guide rails 30, 31 run horizontally in the direction of the Y coordinate axis so that carriages 26, 27 move in one horizontal plane. In contrast thereto, in the embodiment according to FIGS. 5 and 6, guide rails 57, 58 run at an acute angle of inclination of, for example, 10° to 45° from the front bottom to the rear top, as shown in FIGS. 5A and 5B. Guide rails 57, 58 are mounted to two lateral pedestals 55, 56 adjacent to the side walls of the machine body. On each guide rail 57, 58 a carriage 59, 60, or a side part of a carriage structure, can be moved, wherein electric linear motors as in the embodiment according to FIG. 1 or also other suitable drive assemblies, such as, for example, pressure fluid cylinders, ball screw drives or the like, may be used as carriage drives. The formation and support of console 25 and rotational or rotary carrier or table 51 of the carriage device according to FIGS. 5A and 5B correspond to that of the embodiment shown in FIGS. 1-3. In both embodiments console 25, together workpiece table 51, can be pivoted continuously from the horizontal position according to FIGS. 1A and 5A into the vertical position (and beyond) according to FIGS.

1B and 5B, namely by a translational travel movement alone of carriages 26, 27 and 59, 60, respectively, either in the horizontal (FIGS. 1A, 1B) or in an inclined plane (FIGS. 5A, 5B).

FIGS. 6A-6D schematically show four stages of the mode of operation of the embodiment according to FIG. 5, corresponding to the movements shown in FIGS. 4A to 4C. In the operational state shown in FIG. 6A, carriages 59, 60 and in console 25 (with bearings 33, 34) are located at the front lower end region of carrier rails 57, 58, and workpiece table 51 assumes a horizontal position. In FIG. 6B, carriages 59, 60 and bearings 33, 34 of the console have been moved up to approximately the center of the guide rails and the console, together with the workpiece table, is in an inclined position at an angle of inclination of about 40°. In FIG. 6C, carriages 59, 60 and console bearings 33, 34 have been moved up to near the rear upper end region of guide rails 57, 58, whereby console 25, and thus also workpiece table 51, assume a vertical position, which is also shown in FIG. 5B. When carriages 59, 60 are moved further by a small amount, console 25 and workpiece table 51 reach the "tipped-over" position shown in FIG. 6D in which, for example, indentations can be recessed in a workpiece.

In the above carrier device described by referring to FIGS. 5 and 6, the result is an increase of the coupling/starting angle and a carriage movement on inclined guides is performed. Thus, shortened linear paths for realizing the pivoting movement of console 25 and workpiece table 51 are achieved which means increased chip productions of the machine. Furthermore, an approximately linear movement process and an increased pivoting range of the workpiece table of about −10° to about +120° can be achieved.

The carrier devices described above in detail offer a number of advantages in comparison to the prior art. For example, the overlaying of linear and pivoting movements of the workpiece table leads to a particularly favorable use of the machine space and only little limitation of the working space in the perpendicular position of the workpiece table. Furthermore, high accuracies are achieved by short thermally active lengths between a measuring system and the tool or workpiece carrier. As the weight of the individual devices has only small influence on the machine geometry, it is possible to achieve high geometrical accuracies and high dynamics due to the relatively small moved masses. The symmetrical accommodation of the carrier device on a total of four spaced-apart pivoting joints having short lever arms enables a high overall rigidity of this carrier device. The particular kinematic coupling of the bridge-like console via the rotational bearings to the linear carriages that can be moved linearly, horizontally, or in an inclined manner on the one hand, and via the crank-like arms rotatably coupled to the stationary machine walls on the other hand, makes it possible to realize even negative alignment angles of the workpiece table without any problems by measuring the travel movement of the carriages. Furthermore, the relatively simple integration of different technical systems for realizing a rotational axis function, for example, of a rotary workpiece table driven by a torque motor or a rotational spindle, is an advantage. The limitation of the working space when the tool or workpiece carrier is handled in the rotational axis may be optimized by suitably selecting the geometry of the coupling members, for example, the length and shape of the arms rotatably supported at both ends, as well as the position and the distances of the pivoting joints.

The suspension of the workpiece or tool carrier and of box-like console 25, respectively, in the region of the four "corner points," leads to small bendings and torsions and thus to high rigidity even under high dynamic loads. As the console and the associated components thereof may be designed to be light-weight, relatively small moved masses and thus high dynamics result. There is the possibility to use a pallet changer with direct handling of the pallets because the articulated arms may be disposed and hinged, respectively, at the rear end of the console.

Figure 7:
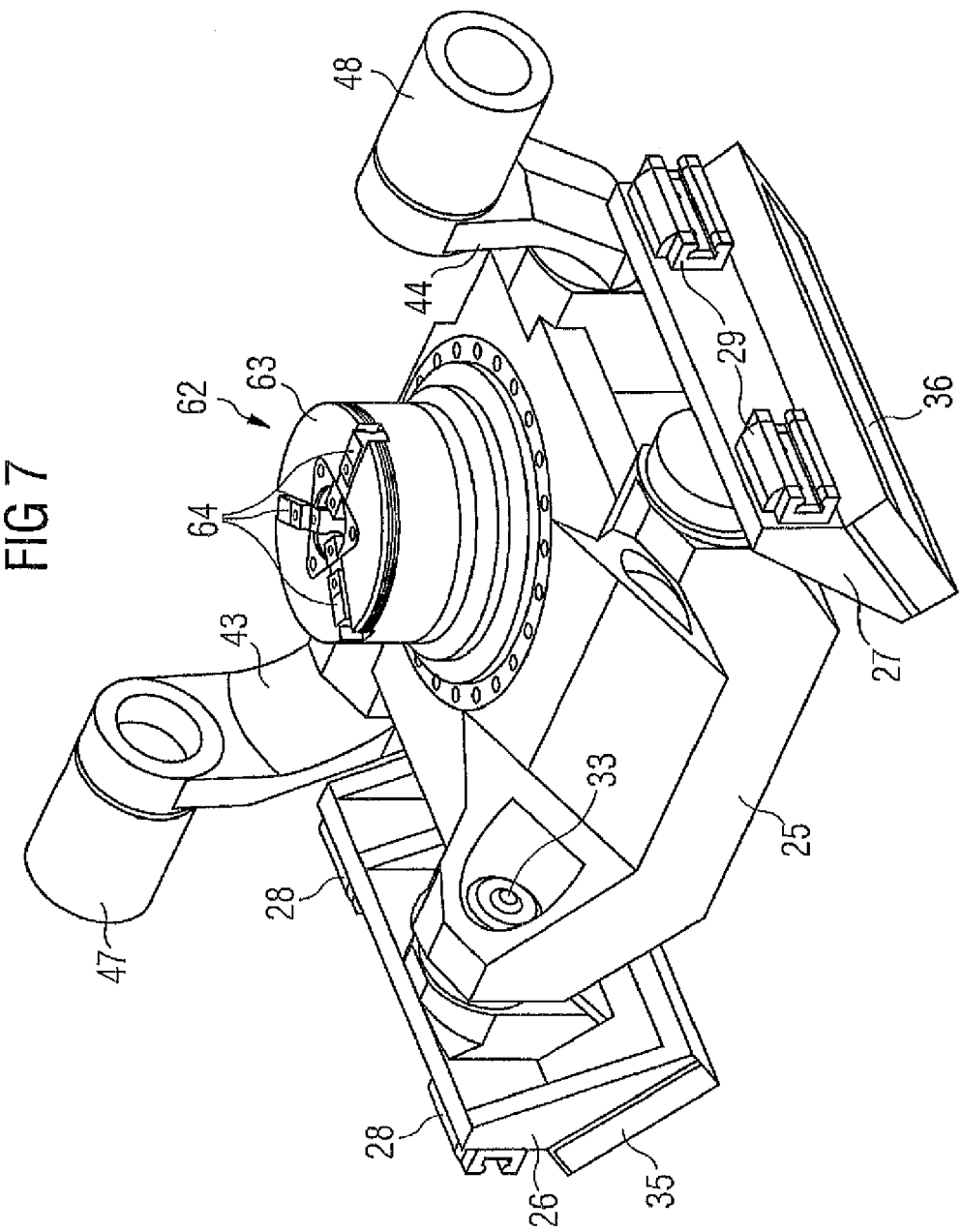
FIG. 7 is a perspective view of another embodiment of a carrier device according to the invention, comprising a spindle holder and a chuck, respectively.

Instead of the rotary table shown in FIGS. 1 and 2, it is also possible to use special tool spindles in the carrier device according to embodiments of the invention, for example, rotational spindles, or clamping devices for rotational machining, as shown in FIG. 7.

The carrier device shown in FIG. 7 largely corresponds to the embodiment of FIG. 2 and may be used in one of the machine tools illustrated in FIGS. 1 and 6, respectively. In the device according to FIG. 7 the components that are the same as those in the embodiment according to FIGS. 1 and 2 are designated by the same reference numerals. Instead of a rotary table 51, the carrier device shown in FIG. 7 has a holding means 62 disposed on the top surface of bridge-like console 25 for fixedly holding a tool or a workpiece. Holding means 62 as shown in this case is formed as a clamping chuck that has cylindrical body 63 supported on the top surface of the console, in which three chuck jaws 64 are disposed which are mutually angularly spaced by about 120°, each of which is radially displaceable. In clamping chuck 62 a workpiece (not shown) can be fixedly clamped. Cylindrical body 63 of clamping chuck 62 can be rotationally driven for performing rotational machining operations on the clamped workpiece, namely, in a suitable manner by a drive motor (not shown) installed in console 25 or integrated in holding means 62. In addition thereto, there is also the possibility to clamp a tool, for example, a lathe chisel, in the clamping chuck and to insert a short workpiece to be machined in the machine tool according to FIGS. 1 and 5, respectively, in the milling head 15, 16 thereof so that rotational machining operations can be performed on this workpiece.

In the embodiments shown, and in reasonable equivalents thereto, the possibility that larger workpieces may be machined on smaller machine tools, which may mean lower investment costs and shorter part production times, is of particularly practical advantage. Here, the coupling kinematics allows very high movement dynamics due to the small moved masses. The powerful pivoting drives, which so far have been required for table structures of this general type, may be omitted in the carrier device developed according to the invention embodiments described herein, and reasonable equivalents.

What is claimed is:

1. In a machine tool having a rigid body with spaced side walls, a carrier device for workpieces, the carrier device comprising:

carriage means coupled to the side walls of the rigid body for linear displacement with respect to the side walls along a predetermined path;

a console pivotably supported on said carriage means between the side walls for the linear displacement therewith;

a carrier for a workpiece, said carrier being mounted to said console for pivotable movement therewith;

drive means partially on said carriage means for effecting the linear displacement;

pivotable support means comprising crank-like arms, each having one end rotatably mounted to said console, and an opposite end rotatably mounted to a respective one of the side walls of the rigid body;

whereby said console and said carrier are pivotable to selected operating positions resulting from the linear displacement and from the kinematic coupling of said console to the rigid body by said pivotable support means.

2. The carrier device according to claim 1, wherein said console is formed as a pivoting bridge and is coupled to said carriage means via rotational bearings to achieve the pivotable support.

3. The carrier device according to claim 1, wherein said carriage means comprises two carriages.

4. The carrier device according to claim 1, where the crank-like arms comprises two of the crank-like arms, one end of each said crank-like arm being supported in a respective first rotational bearing in the respective side wall of the rigid body.

5. The carrier device according to claim 4, wherein said crank-like arms each have a curved shape and have, at an end opposite said one end, an inward facing bearing bush for rotational coupling to said console, and, at said one end, having an outward facing bearing bush for the rotational coupling to the respective side wall.

6. The carrier device according to claim 4, wherein said crank-like arms are rotationally coupled to said console by means of second rotational bearings which are spaced by a predetermined distance from third rotational bearings coupling said console to said carriage means.

7. The carrier device according to claim 6, wherein said second rotational bearings and said third rotational bearings lie in a common plane.

8. The carrier device according to claim 1, wherein said pivotable support means kinematically couples said console to said rigid body in an articulated manner.

9. The carrier device according to claim 1, whereby said carriage means is displaceable on guide rails mounted to the side walls at a front section of the rigid body, the guide rails being mounted on pedestals on said front section.

10. The carrier device according to claim 9, wherein said guide rails run in a manner so as to be inclined at an acute angle from a front bottom of the machine tool to a rear top of the machine tool.

11. The carrier device according to claim 1, further comprising guide rails for guiding the linear displacement of the carriage means, wherein said guide rails run in a generally horizontal plane.

12. The carrier device according to claim 1, wherein said drive means comprises at least one electric linear motor.

13. The carrier device according to claim 12, wherein said drive means comprises two synchronized electric linear motors disposed on opposite sides of said console and on the side walls and are oppositely inclined on bevelled pedestals on inner surfaces of the side walls.

14. In a machine tool having a rigid body with spaced side walls, a carrier device for carrying workpieces and tools, the carrier device comprising:
  carriage means coupled to the side walls of the rigid body for linear displacement with respect to the side walls along a predetermined path;
  a console pivotably supported on said carriage means between the side walls for the linear displacement therewith;
  a carrier configured to be able to carry a workpiece and also to be able to carry a tool in place of the workpiece, said carrier being mounted to said console for pivotable movement therewith;
  drive means partially on said carriage means for effecting the linear displacement;
  pivotable support means comprising crank-like arms, each having one end rotatably mounted to said console, and an opposite end rotatably mounted to a respective one of the side walls of the rigid body;
  whereby said console and said carrier are pivotable to selected operating positions resulting from the linear displacement and from the kinematic coupling of said console to the rigid body by said pivotable support means.

15. The carrier device according claim 14, wherein said carrier comprises a holding means on said console for the turning of a workpiece.

16. The carrier device according to claim 15, wherein said holding means is configured as a rotationally driven chuck to clamp a workpiece or a tool.

* * * * *